United States Patent Office 2,809,893
Patented Oct. 15, 1957

2,809,893

GEL-FORMING COMPOSITION AND METHOD OF MANUFACTURE

Arthur E. Poarch, Mill Valley, and George W. Twieg, Gustine, Calif., assignors to Avoset Company, San Francisco, Calif., a corporation of Delaware No Drawing. Application May 19, 1955,
Serial No. 509,686

17 Claims. (Cl. 99—131)

This invention relates to a gel-forming composition and to a method of making it, and more particularly to an edible gel-forming composition of the dessert-type comprising algin and a salt of an alkaline earth metal adapted to rapidly form a palatable gel, having a smooth, firm, and rubbery texture, by the mere addition of cold water to the composition. The term "algin" as herein used, means a water soluble alginate, such as an alkali metal salt of alginic acid.

In our United States Patent No. 2,701,767, we disclosed a one package calcium-inducible gel-forming composition of the low methoxyl pectin type which can be readily dissolved in cold water to form a gel of satisfactory texture within a time period of 1 to 30 minutes, and, preferably, within a period not in excess of about 10 minutes. This composition was arrived at by first pretreating the pectin and the calcium salt and by then mixing these two principal reactants together in the dry state with such conventional sweetening, flavoring and coloring additives as were called for to provide a satisfactory tasting dessert gel. The low methoxyl pectin was pre-treated by dissolving it in water along with a monovalent metal salt of an incompletely ionizing, or weak, acid, such as sodium citrate, sodium acetate, and sodium propionate, and/or a monovalent metal salt of a complex acid of phosphorous or of ethylene diamine tetra acetic acid, such as sodium hexametaphosphate and sodium ethylene diamine tetra acetate. The calcium salt was pre-treated, depending upon its solubility property, by coating it with a cold water dispersible material, with such coating having the effect of deferring the solution or ionization of the salt until the pectin was thoroughly dissolved in the cold water.

We have now discovered and have experimentally established that substantially the same pre-treatment of algin enables the attainment of the following primary object of the present invention: the provision of a one package calcium-inducible gel-forming composition of the algin type which can be readily dissolved in cold water to form a palatable, smooth, firm, and rubbery gel within a period of 1–30 minutes, and preferably within a ten minute period.

A preferred embodiment of the subject composition and the method of making it is as follows. An aqueous solution of algin, sodium hexametaphosphate, and sodium citrate is first formed, and then this solution is spray-dried to produce a powder having the following composition by weight:

|  | Percent |
|---|---|
| Algin | 72.2 |
| Sodium hexametaphosphate | 21.65 |
| Sodium citrate | 6.15 |

The algin employed was potassium alginate.

The algin and the two modifying agents are combined with water to form a heavy viscous solution having 13% solids, following which the solution is spray-dried, as above mentioned. For the purpose of obtaining a more pleasing texture for the eventual gel, a portion of the spray-dried product which passes through a No. 325 sieve is re-cycled through the drier and re-sprayed. The final powder, or algin-factor, has a particle size range such that: all of the particles will pass through a No. 60 sieve; approximately 90% of the particles will be retained on a No. 325 sieve; and approximately 10% of the particles will pass through a No. 325 sieve.

This algin factor is then incorporated in the following gel-forming composition:

| | |
|---|---|
| Sugar (cane or beet) | 95.0 parts. |
| Algin factor | 4.0 parts. |
| Sodium citrate | 1.5 parts. |
| Anhydrous powdered citric acid | 2.5 parts. |
| "V–90" | 0.8 part. |
| Natural or artificial flavor | 0–0.1 part (or according to choice). |
| Food coloring | 0–0.03 part (or according to choice). |

These constituents of the gel-forming composition are dry-blended together in a powder mixture, and then added to approximately 470 parts by weight of cold water. The resulting mixture is stirred vigorously for about 90 to 120 seconds and then allowed to stand for 6 to 10 minutes. At the end of this time, there has been produced a palatable, smooth, firm, and rubbery gel.

The term "V–90" in the above formulation is a trademark identifying a modified mono-calcium phosphate. This salt is heat-treated anhydrous mono-calcium phosphate which is produced according to the methods set forth in U. S. Patents 2,160,232 and 2,160,700. Other specific calcium salts, such as uncoated mono-calcium phosphate and coated calcium sulfate, may be employed in the gel-forming composition. The specific limitedly soluble calcium salt to be employed, and whether it is to be coated or uncoated, are matters of choice depending upon the textural properties desired for the eventual gel.

The calcium salt has an average particle size corresponding to the size of the mesh openings of a No. 325 sieve.

The citric acid constituent of the above formulation is utilized for two reasons: to obtain a desired taste quality of sourness in the gel; and to increase the gel formation reaction time. The sodium citrate, on the other hand, is employed to buffer the calcium solution promotion effect of the citric acid to prevent undue speed of the gel formation reaction. The function of the two constituents, citric acid and sodium citrate, taken together, is to promote, but not unduly, the release of calcium ions, while obtaining the desired degree of sourness of the final dessert gel.

It is to be pointed out that normally insoluble algin material or alginic acid may be utilized in the gel-forming composition provided that additional reactants which are alkaline in nature are employed to cause the solution of such algin material or alginic acid.

While a specific example of the subject composition and method of making it has been set forth, it is to be understood that all substantial equivalents thereof are considered to be within the spirit and scope of the invention.

What is claimed is:

1. A dry powdered mixture adapted to form an edible gel upon the addition thereto of water comprising a calcium salt of limited solubility in water and the solute obtained from an aqueous calcium salt-free solution of: an alkali metal alginate; sodium hexametaphosphate; and sodium citrate.

2. The mixture of claim 1 wherein the composition by weight of said solute is: approximately 72% alginate; approximately 21.5% sodium hexametaphosphate; and approximately 6% sodium citrate.

3. The mixture of claim 2 wherein said calcium salt is heat-treated anhydrous mono-calcium phosphate.

4. The mixture of claim 3 wherein the parts by weight ratio of said solute to said mono-calcium phosphate is approximately 5:1.

5. A dry powdered mixture adapted to form an edible gel upon the addition thereto of water comprising a calcium salt of limited solubility in water and the solute obtained from an aqueous calcium salt-free solution of: an alkali metal alginate, sodium hexametaphosphate, and sodium citrate; the amount by weight of said sodium salts being approximately 38% of the weight of said alginate.

6. The mixture of claim 5, said sodium hexametaphosphate being present in said solute in an amount by weight which is approximately 30% of the weight of said alginate, with said sodium citrate being present in an amount by weight which is approximately 8% of the weight of said alginate.

7. The mixtures of claim 6, wherein the weight proportion therein between said solute and calcium salt is approximately 5 parts of solute to one part of salt.

8. The mixture of claim 7, wherein the particle size of said solute is such that all of the particles will pass through a No. 60 sieve and such that the majority of said particles will not pass through a No. 325 sieve.

9. The mixture of claim 8, wherein the average particle size of said calcium salt corresponds approximately with the size of the mesh openings of a No. 325 sieve.

10. A dry powdered mixture adapted to form an edible gel upon the addition thereto of water comprising the solute obtained from the drying of an aqueous calcium salt-free solution of a water soluble alginate and sodium citrate, and a calcium salt of limited solubility in water.

11. A dry powdered mixture adapted to form an edible gel upon the addition thereto of water comprising the solute obtained from the drying of an aqueous calcium salt-free solution of a water soluble alginate and sodium hexametaphosphate, and a calcium salt of limited solubility in water.

12. An edible gel comprising the product resulting from the reaction in water of a solute, obtained from the drying of an aqueous calcium salt-free solution of an alkali metal alginate, sodium hexametaphosphate and sodium citrate, with heat-treated anhydrous mono-calcium phosphate.

13. The edible gel of claim 12 wherein said sodium hexametaphosphate amounts to approximately 30% by weight of said alginate, said sodium citrate amounts to approximately 8% by weight of said alginate, with said gel containing 4 parts of said solute and 0.8 parts of said calcium salt.

14. In a gel-forming composition of the calcium-sensitive type; a mixture of a calcium salt of limited solubility in water and solute materials obtained from the drying of an aqueous solution containing as a solute an alkali metal alginate and a sodium salt of the group consisting of sodium hexametaphosphate and sodium citrate, said solution being free of any salt of calcium.

15. A method of producing a gel-forming composition comprising forming an aqueous calcium salt-free solution of an alkali metal alginate, sodium hexametaphosphate and sodium citrate, drying the solution to obtain the solute phase thereof, and mixing said solute and a calcium salt together in discrete particle form.

16. A method of producing a gel comprising forming an aqueous calcium salt-free solution of an alkali metal alginate, sodium hexametaphosphate and sodium citrate, drying the solution to obtain the solute phase thereof, mixing said solute and a calcium salt together in discrete particle form, and adding said mixture to cold water.

17. A method of modifying the gel-forming and water solubility characteristics of an alkali metal alginate comprising forming an aqueous calcium salt-free solution of said alginate, sodium hexametaphosphate and sodium citrate, and drying said solution to obtain the solute mixture thereof.

References Cited in the file of this patent

UNITED STATES PATENTS

| | | |
|---|---|---|
| 2,441,729 | Steiner | May 18, 1948 |
| 2,701,767 | Twieg et al. | Feb. 8, 1955 |